United States Patent
Aizawa (10) Patent No.: US 7,535,490 B2
(45) Date of Patent: May 19, 2009

(54) IMAGING APPARATUS HAVING CONTROL MODES SWITCHABLE BASED ON CONNECTION TO ANOTHER APPARATUS

(75) Inventor: Takashi Aizawa, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 645 days.

(21) Appl. No.: 11/041,726

(22) Filed: Jan. 25, 2005

(65) Prior Publication Data

US 2005/0174460 A1    Aug. 11, 2005

(30) Foreign Application Priority Data

Feb. 6, 2004    (JP)    ............................ 2004-031112

(51) Int. Cl.
  *H04N 5/225*    (2006.01)
  *H04N 5/222*    (2006.01)
  *H04N 5/232*    (2006.01)

(52) U.S. Cl. ........................... 348/207.11; 348/333.13; 348/211.1; 348/372

(58) Field of Classification Search .............. 348/207.1, 348/207.11, 207.2, 333.13, 333.01, 211.1, 348/372

See application file for complete search history.

(56) References Cited

U.S. PATENT DOCUMENTS 6,819,355 B1 * 11/2004 Niikawa ................ 348/207.11
7,046,276 B2 * 5/2006 Hashimoto et al. ....... 348/220.1
2002/0063781 A1    5/2002 Aizawa .................... 348/211
2004/0109062 A1 * 6/2004 Yamaya .................. 348/207.1

FOREIGN PATENT DOCUMENTS

| JP | 11-266383 A | 9/1999 |
| JP | 2000-333068 A | 11/2000 |
| JP | 2002-077690 A | 3/2002 |
| JP | 2002-133406 | 5/2002 |
| JP | 2003-125271 | 4/2003 |

* cited by examiner

*Primary Examiner*—Nhan T Tran
(74) *Attorney, Agent, or Firm*—Fitzpatrick, Cella, Harper & Scinto

(57) ABSTRACT

An imaging apparatus includes an imaging unit, a record and reproduction unit for recording and reproducing image data on and from a record medium, a display unit, a communication unit arranged to transmit captured image data and reproduced image data to an external device, and a mode switch unit for switching over a plurality of operation modes in accordance with a connection status of the communication unit. The operation modes include a first mode, in which the communication unit is operated and operations of the imaging unit and the display unit are stopped; a second mode, in which the communication unit and the display unit are operated to display an image reproduced from the record medium on the display unit, and operation of the imaging unit is stopped; and a third mode, in which the imaging unit, the display unit, and the communication unit are operated to display an image captured by the imaging unit on the display unit.

17 Claims, 9 Drawing Sheets

| TRANSFER OF ALL IMAGES |
| TRANSFER OF SELECTED IMAGE |
| TRANSFER OF IMAGE NOT SUBJECTED TO TRANSFER |

FIG. 10

IMAGING APPARATUS HAVING CONTROL MODES SWITCHABLE BASED ON CONNECTION TO ANOTHER APPARATUS

BACKGROUND OF THE INVENTION

1. Field of the Invention

The present invention relates to an imaging apparatus, and more specifically to an apparatus capable of switching an operation mode in accordance with a status of connection with a PC (personal computer), a printer, etc.

2. Related Background Art

Conventionally, a system for connecting a digital camera with an information processing apparatus such as a personal computer (PC), etc., via a cable, etc., so that the information such as image data, etc., recorded on a recording apparatus in the digital camera or on a record medium attached detachably to the digital camera can be transferred to the PC has been developed and introduced commercially (for example, Japanese Patent Application Laid-Open No. 2003-125271).

In recent years, a system in which a digital camera can be directly connected to a printer via a cable to attain printing without a PC has become commercially practical. In this case, there are different devices such as a PC and a printer to be connected to a digital camera. If an interface and a protocol which can be commonly used by these different devices in communication with a camera are available, the camera can communicate with these different devices without any problems.

Lately, a standard called "Pict Bridge" has been proposed as a system for communication between a camera and a printer which are directly connected.

In the version 1.0 of this standard, a camera is connected to a printer via a general-purpose bus of a type called "USB" (universal serial bus), and the printer functions as a host of the USB. Data exchange is performed using PTP (picture transfer protocol) as a communication protocol. The protocol is also a general-purpose protocol prescribed by the still imaging device class of the USB as a data exchange protocol for a PC and a camera.

Thus, a camera can communicate data through a common protocol independent of the type of device with which it is communicating (the "communicatee"). Using the Pict Bridge, data exchange called "service discovery" is performed in order to recognize whether the communicatee is a printer adaptable to the Pict Bridge. Through the data exchange, the printer and the camera recognize whether or not each other is adaptable to the Pict Bridge, and a service is offered by exchanging script data described in a data format predetermined by the Pict Bridge.

On the other hand, conventionally, when a camera is connected to a PC, the camera has normally been operated by the PC, and there is little opportunity to operate the camera itself. Therefore, except with a small number of digital cameras for professional use, a power saving effect has been expected by turning off the operation of the camera and the display device thereof in the PC connection mode when the camera is connected to the PC.

Digital cameras such as those for professional use can use a relatively large number of resources such as ROM, RAM, etc., in the camera, and a battery of a large capacity can be used. Therefore, when a PC is connected, no PC connection mode may be required in the operation of the camera. However, with a common compact digital camera, there are restrictions on the resources and power supply, and thus the resources of the ROM and RAM are saved by exclusively controlling the internal status, and no power is supplied to an inactive block, to save the power when the PC is connected.

Conventionally, different communication protocols have been used among manufacturers in connection to the printer and a digital camera and a printer therefore cannot be connected unless they are manufactured by the same manufacturer. However, there have been digital cameras operable by connecting them to the printer directly via USB by placing them in communication with a PC using the USB. In this case, since one protocol is used in a case in which the camera is connected to a PC and a different protocol is used in a case in which the camera is connected to a printer, it is necessary to implement a plurality of protocols in the camera. As described above, when there are a plurality of communication modes in a digital camera, it is necessary to switch over between them.

In the conventional system, as described above, different communication protocols are used for connection to a PC and a printer, or a unique protocol is used for each type of device. Therefore, it has been necessary to switch the communication mode when a digital camera recognizes that a device with which it needs to communicate is using a different protocol or when a communication mode switch command is received.

There is also a technology for making the operation of a camera valid under the control of a PC when the camera is connected to the PC, displaying an image, etc., on the display device implemented in the camera, and allowing a user to operate the member of a camera to transfer the image to the PC (for example, Japanese Patent Application Laid-Open No. 2002-133406, corresponding to U.S. Patent Application Publication 2002-063781).

Thus, the older method, of merely transferring image data in a camera to a PC which has conventionally been only an external apparatus for storage and browsing the image data, has been enhanced to a model that provides for operating the PC and the camera in cooperation.

However, as described above, in recent years, even if the digital camera is connected to the printer, the standard of data communications using a digital camera connected to external equipment has been standardized in many cases, so that the protocol used when a PC is connected can be used. In this case, the communicatee can be recognized only after discovery is performed for recognition of the communicatee defined with the standardized regulations.

Although there is little problem if all devices to which a digital camera is connected are in compliance with the Pict Bridge standard, an application having no relation with the Pict Bridge standard is connected in the current status of connecting to a normal PC. In this case, unlike the conventional cases, there is the problem that the camera cannot find the timing at which it is to enter a communication mode when it is connected to a PC. Otherwise, it is necessary for a user, before connection with an external apparatus, to select the setting of a digital camera to decide whether the digital camera is connected to a printer or a PC, and it is therefore necessary to connect the camera to the external device to change the process to be performed.

Furthermore, although a digital camera is connected to a device such as a PC, etc., there can be a case in which the communication mode of a camera is switched by an application running in the device. In this case, depending on the communication mode switch timing of the camera, it has become necessary for a camera to use a system which can effectively utilize minimal resources and save electric power.

Therefore, when a digital camera and an external device are connected to each other for communication, a more-detailed method of control in the camera is required.

SUMMARY OF THE INVENTION

The present invention aims at solving the above-mentioned problem.

Another objective of the present invention is to simplify the operation mode switching operation by a user and reduce the power consumption during communications.

To solve the above-mentioned problems and attain the objectives, according to an aspect of the present invention, an imaging apparatus includes: imaging means; record and reproduction means for recording and reproducing image data captured by the imaging means on and from a record medium; display means; communication means arranged to transmit image data obtained by the imaging means and image data reproduced from the record medium to an external device, the communication means being connectable to the external device through a transmission line; and mode switch means for switching over a plurality of operation modes in accordance with a connection status of the communication means, wherein the plurality of operation modes includes: a first mode in which the communication means is operated and operations of the imaging means and the display means are stopped; a second mode in which the communication means and the display means are operated to display an image of image data reproduced from the record medium on the display means, and an operation of the imaging means is stopped; and a third mode in which the imaging means, the display means, and the communication means are operated to display an image of image data obtained by the imaging means on the display means.

Other objectives and features of the present invention are clarified by the detailed explanation of the aspect of the invention by referring to the following drawings.

BRIEF DESCRIPTION OF THE DRAWINGS

FIG. 3 which is comprised of FIGS. 3A and 3B are flowcharts of the operation performed when a USB cable is connected to an external device, and a camera enters an external connection mode;

DESCRIPTION OF THE PREFERRED EMBODIMENTS

The preferred embodiments of the present invention are explained below in detail by referring to the attached drawings.

Figure 1:
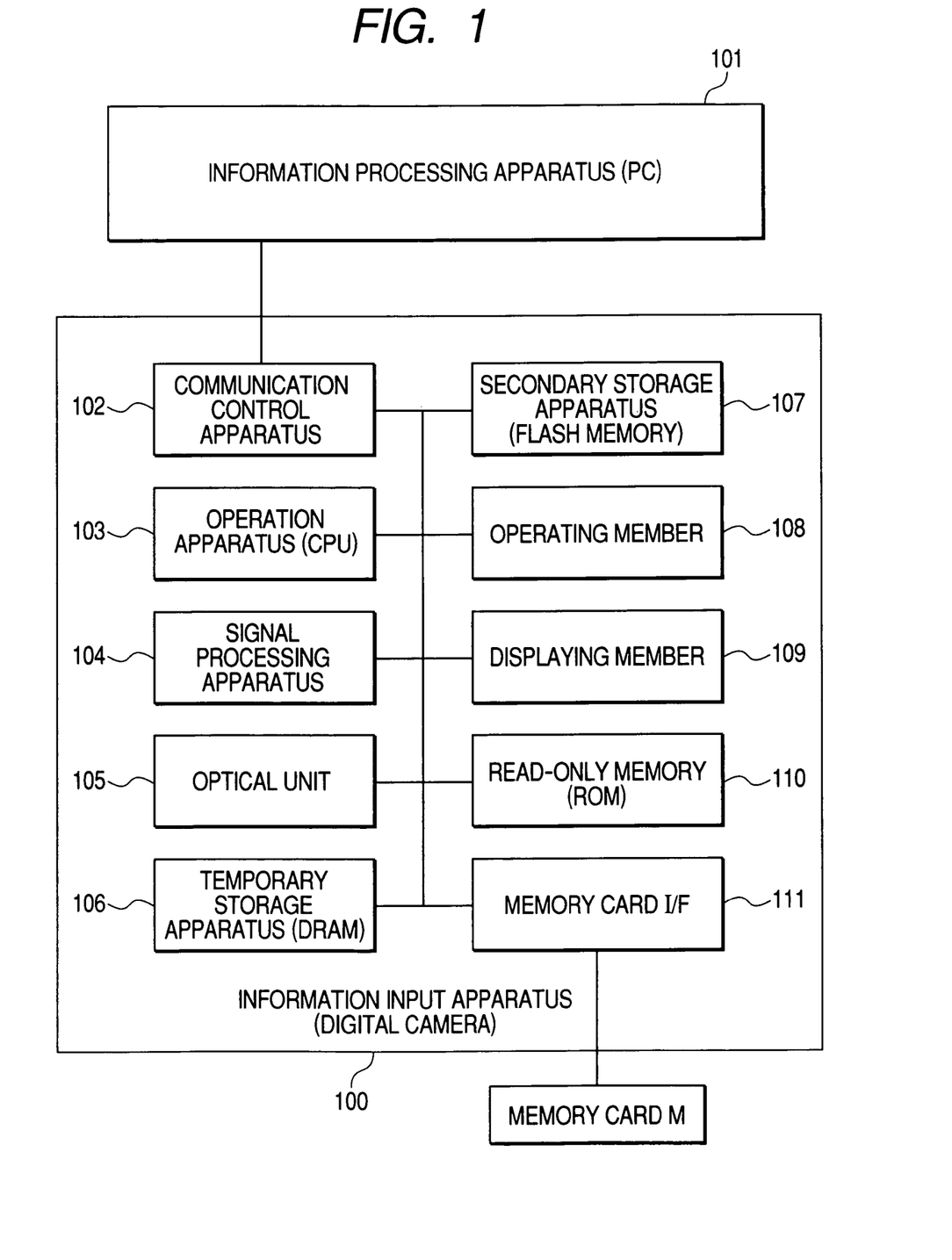
FIG. 1 is a block diagram of the configuration of the digital camera system according to an embodiment of the present invention.

FIG. 1 is a block diagram of the configuration of a digital camera system according to an embodiment of the present invention. In the present embodiment, the system can be roughly divided into units, that is, an information input apparatus 100 (hereinafter referred to as a digital camera) such as a digital camera, etc., and an information processing apparatus 101. The information processing apparatus 101 is normally a PC, which includes an arithmetic processing unit (CPU; not shown), a primary storage apparatus (RAM), a secondary storage apparatus (hard disk), an operation apparatus (keyboard, mouse), a display device (display), etc.

The digital camera 100 can be configured by an optical unit 105 including a lens, a CCD, a drive circuit, etc., a signal processing apparatus 104 for processing image data, etc., an operation apparatus 103 such as a CPU, a primary storage apparatus 106 such as a DRAM, a secondary storage apparatus 107 such as a built-in flash ROM, an operating member 108, a displaying device 109 such as an LCD, read-only memory 110 such as ROM, for use in storing a program, a detachable record medium 111 such as a memory card, and a communication control apparatus 102 for managing a connection to the PC 101. Depending on the type of digital camera, the configuration can be designed to record and reproduce image data on and from only one of the memory card M and the built-in flash ROM 107.

FIGS. 2A to 2D show examples of the connection status according to an embodiment of the present invention.

Figure 2A:
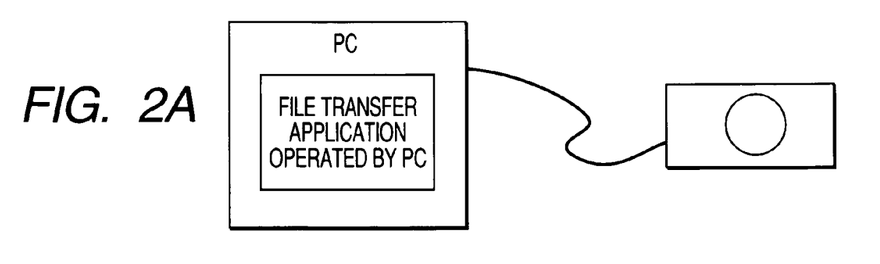
FIGS. 2A, 2B, 2C and 2D are explanatory views of the operation status according to an embodiment of the present invention.
Figure 2B:
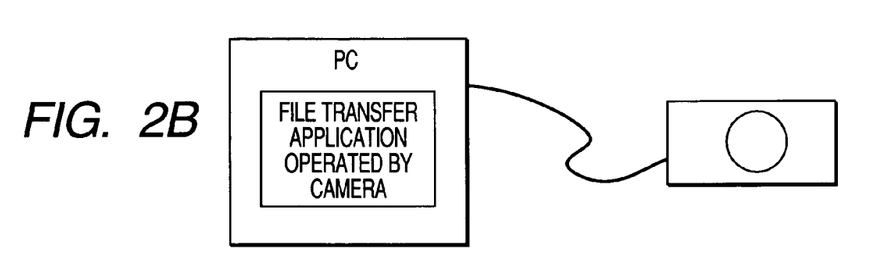
Figure 2C:
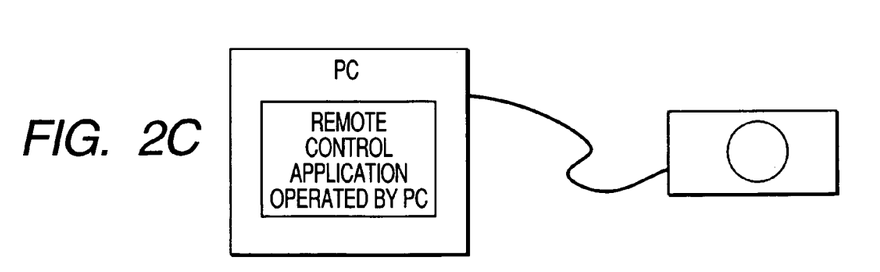

FIGS. 2A, 2B, and 2C show the operation statuses indicated when the digital camera 100 is connected to the PC 101. In these examples, the components are connected via a cable. Currently, the most common connection means for such a connection is indicated by the USB.

FIG. 2A shows an example of a functioning state of what is called a browser software for transferring, displaying, browsing, and storing the information such as image data, recorded in a digital camera on a PC. In this case, the camera is required only to be operated by the PC as a slave to the PC.

Figure 9:
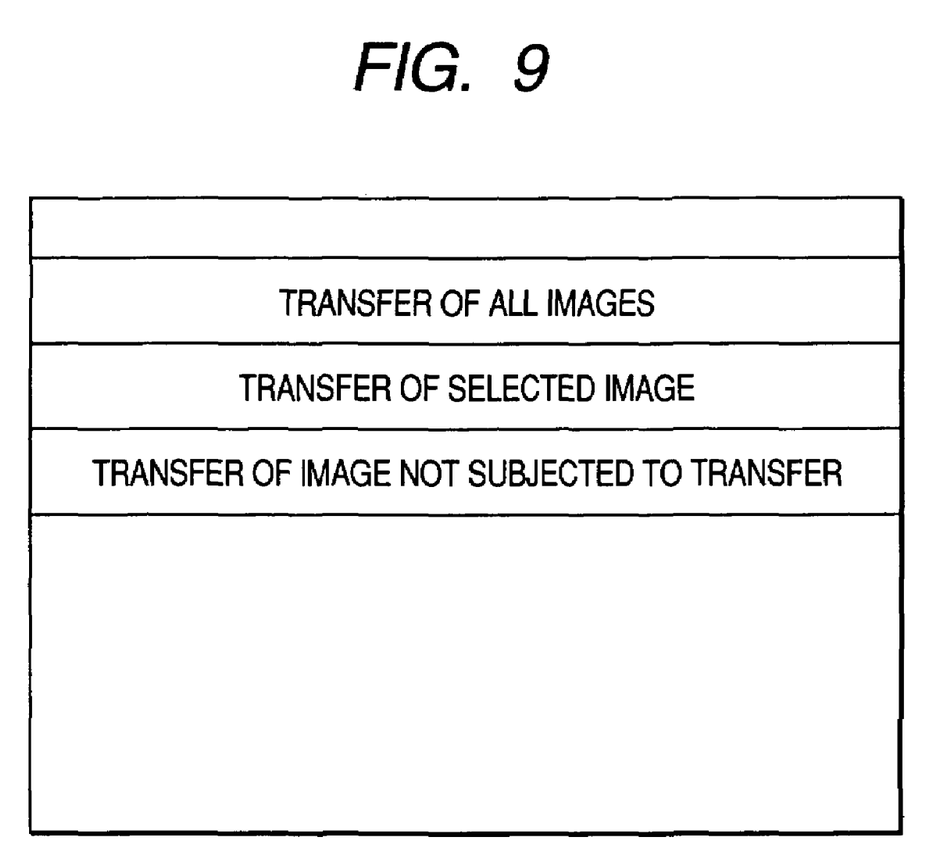
FIG. 9 shows an example of a menu displayed on a display member in a direct transfer mode.

FIG. 2B shows the functioning status of an application for transferring data in the camera to the PC to display, browse, and store the data in the camera as shown in FIG. 2A. By the operation of a camera, an image is selected and a transfer thereof is started. In the above-mentioned application, the menu as shown in FIG. 9 is displayed on the display device on the digital camera side, and by operating the operating member of the digital camera, the operation of an application is controlled. The digital camera itself functions as a remote control device. In this case, the digital camera functions as the central component, and therefore can use a reproduction function and an operation member, etc.

FIG. 2C shows an example of controlling a capturing operation by operating a camera from the application of the PC. In this case, a shooting operation is performed with a camera by the operation of the application on the PC or by the operation of the operating member of the camera. The shot image is transferred to the PC and stored, and the photographing parameter of the camera and the zoom by a zoom lens can be controlled. At this time, the digital camera has to be configured such that a shooting function is operable in the communication state.

Figure 2D:
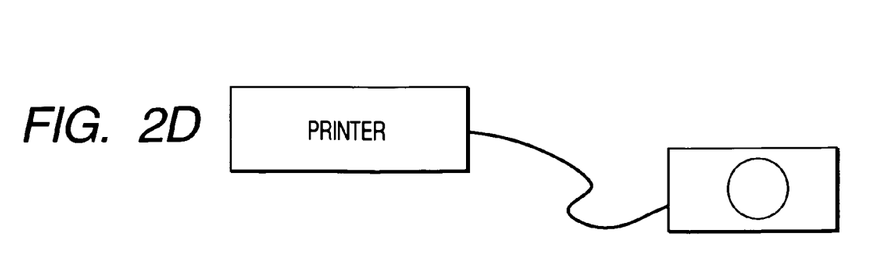

FIG. 2D shows an example of the case in which digital camera and a printer are connected to each other.

In this case, a user operates the operating member of a camera to specify an image or issue an instruction, and then performs printing. At this time, it is necessary that the digital camera is in the communication status, and the printing function can be used.

As described above, when an application of operating a digital camera in cooperation with a PC and an external device such as a printer is considered, it is necessary that the digital camera can operate functions necessary for not only a communication control apparatus but also each application.

Figure 10:
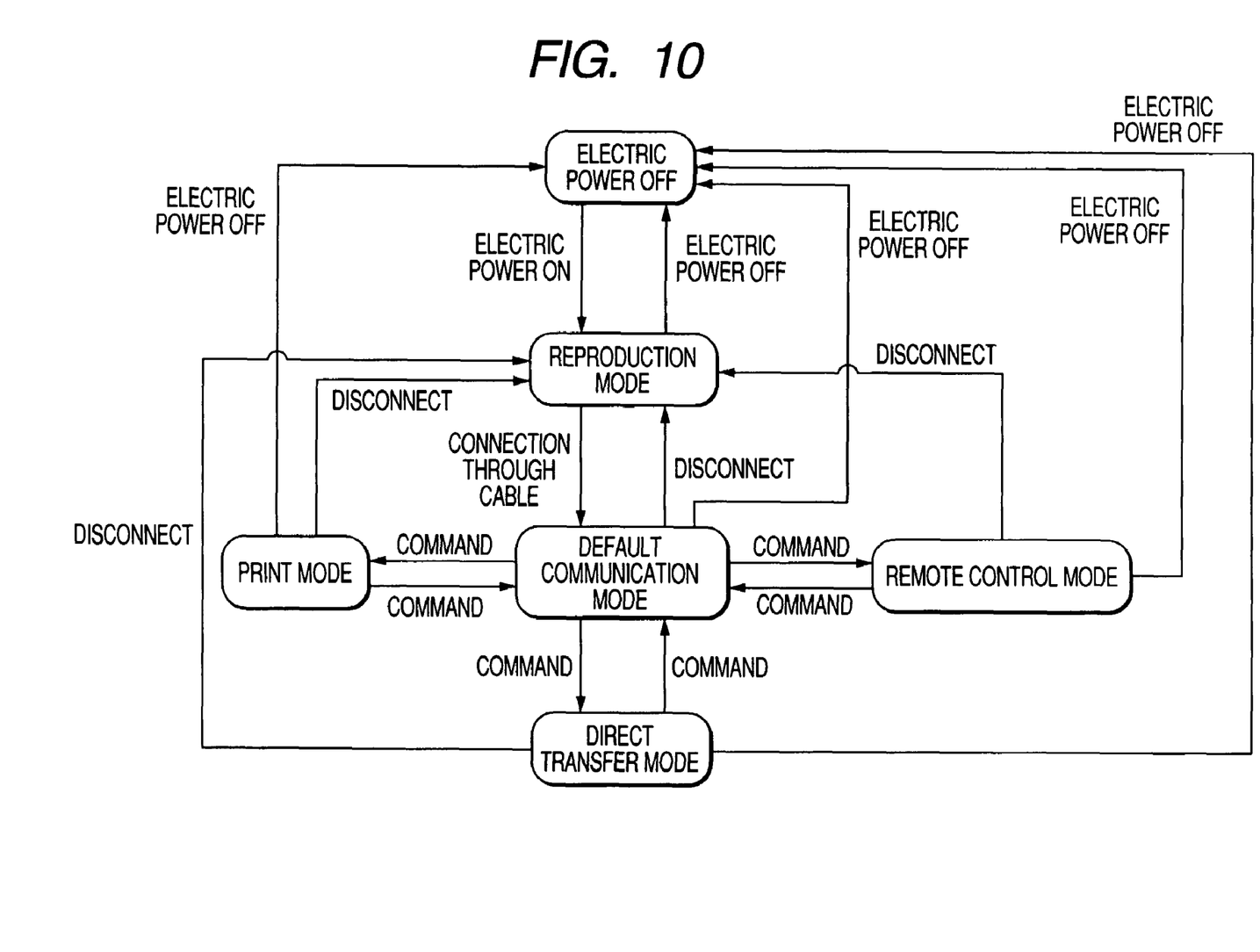
FIG. 10 shows the state transition of a digital camera according to an embodiment of the present invention.

Described below in detail is the switch of each communication mode according to the present embodiment. FIG. 10 shows the state transition in a digital camera according to the first embodiment of the present invention.

When the camera is powered up from the power-off state by the user operation, the digital camera is activated and enters the reproduction status.

In this status, when the USB cable is connected to an external device, the camera enters a default communication mode. This mode is the most frequently used PC communication mode in which the data in the camera can be transferred or stored by the operation of the PC.

However, in this status, the operation on the camera cannot be performed, and the display member such as the LCD also cannot be activated. When a command to transfer to each mode from this status is issued from an external device, the digital camera enters each corresponding mode.

For example, when a printer is connected, a command to enter a print mode is received, and the camera enters the print mode. In this mode, a user can use the operating controls of the camera to instruct an image to be printed and the start of printing. Therefore, the image data reproduction function for the memory card and the operating controls are available.

If a connection partner is a PC in the default communication mode and a command to enter a direct transfer mode is received from the PC, the camera enters the direct transfer mode. In this mode, as in the print mode, the user operates the operating controls of the camera to select an image to be transferred to the PC, and to start a transfer. To attain this, the reproduction function of image data stored in the memory card and an operating member can be available in the camera.

If the connection partner is a PC in the default communication mode and a command to enter a remote control mode is received from the PC, the camera enters the remote control mode. In this mode, the camera can perform a shooting operation at an instruction from the externally-connected PC. Therefore, the function relating to the shooting operation of the camera becomes valid.

In each communication mode, when a USB cable is disconnected, control exits the communication mode, and is returned to the normal reproduction mode. In each communication mode, when a power supply button is turned off, control exits the communication mode, and enters power-off status.

Figures 3, 3A:
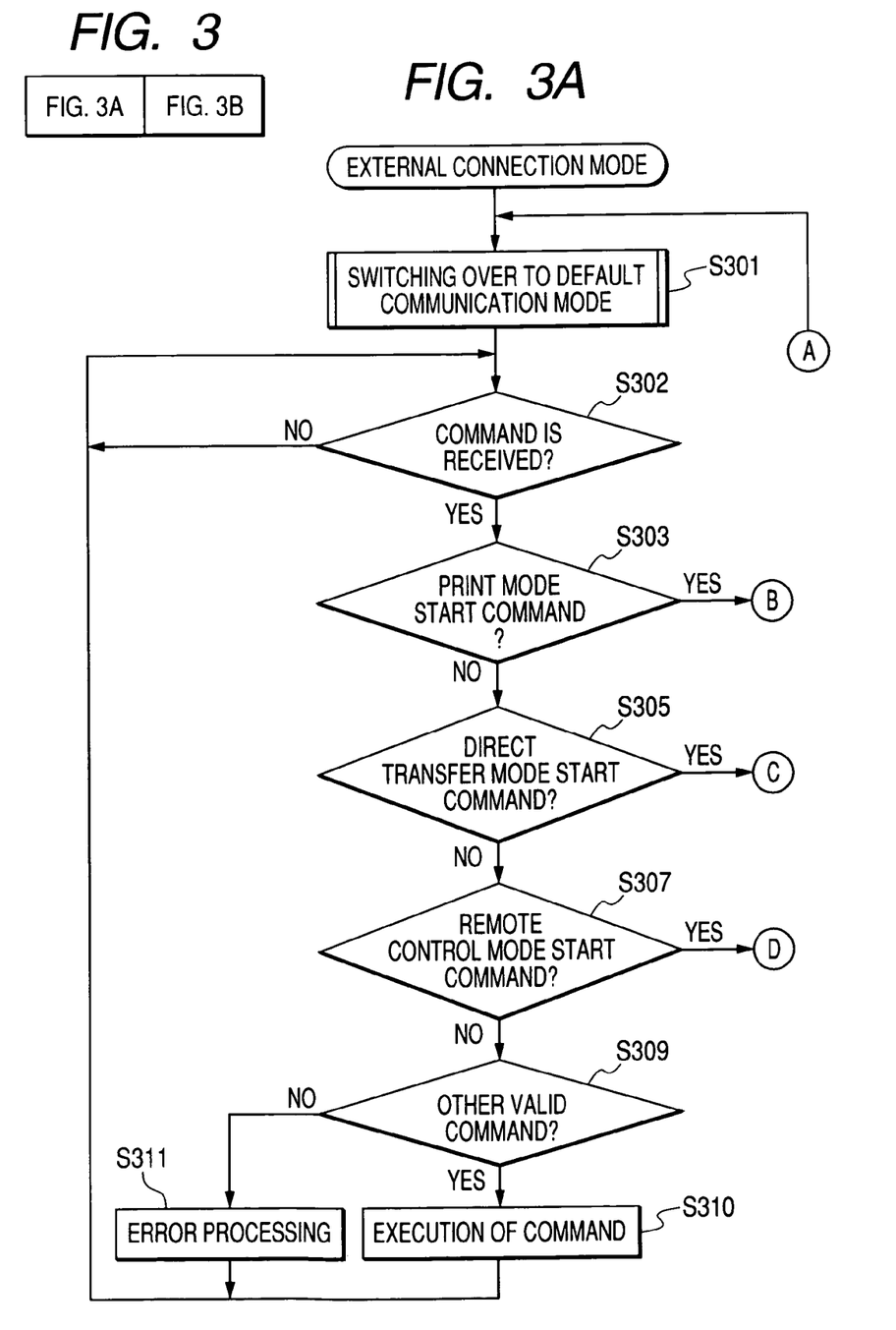
Figure 3B:
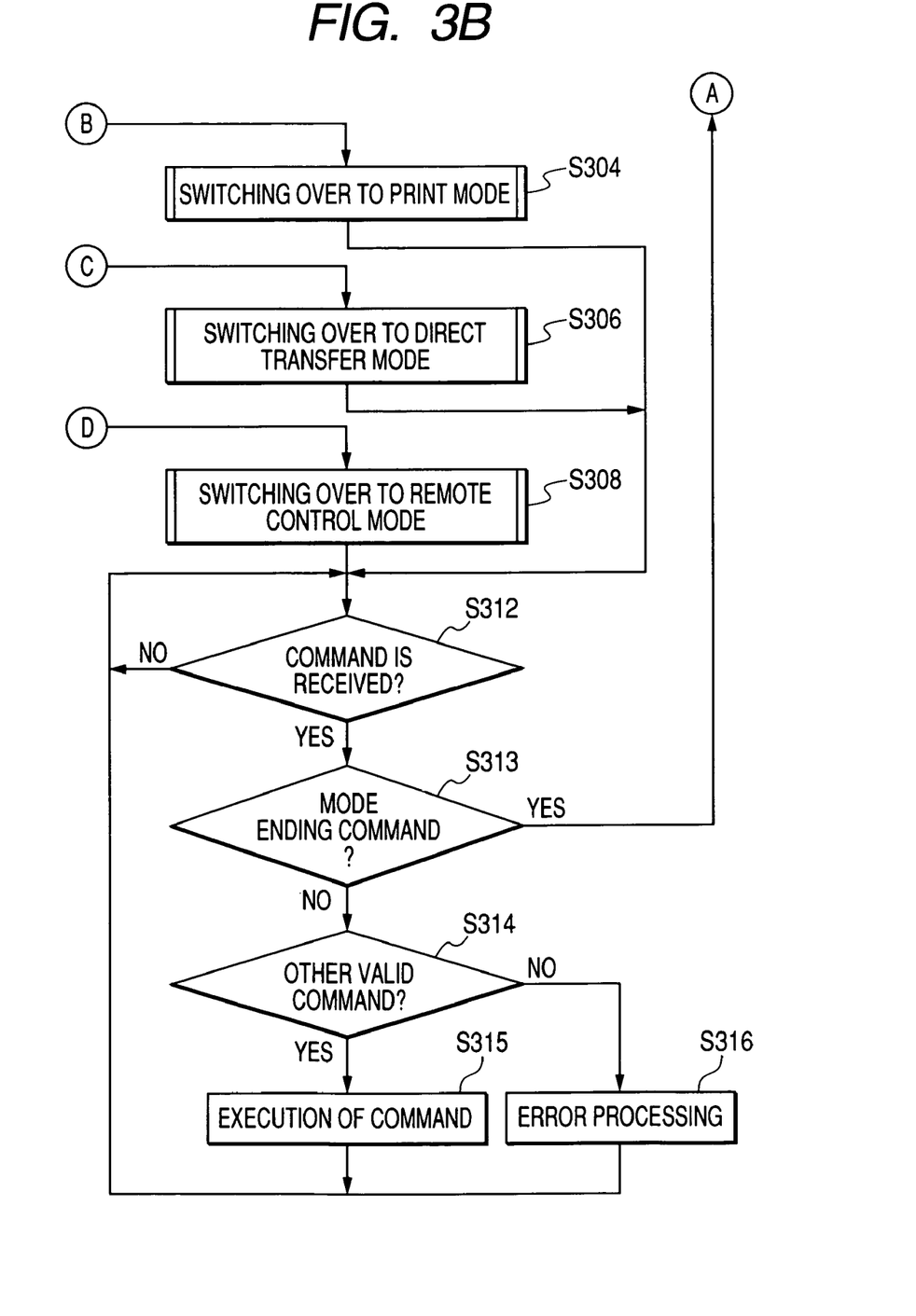

FIGS. 3A and 3B show the operation flow of the digital camera when a digital camera is connected to an external device through a USB cable, and the camera enters an external connection mode.

When an USB connection is established and the external connection mode is entered, control first enters the default communication mode (step S301). In the default communication mode, a command can be received from an external device. Therefore, a command from an external device is awaited.

When a command is received (step S302), it is checked whether or not the command is a trigger to enter a print mode (step S303).

If it is a print mode start command, then control enters the print mode (step S304). Then, the next command is awaited in the print mode (step S312). A command to be received is a command executable in the default communication mode and a command executable only in the print mode.

When a command is received, it is determined whether or not the command is a command to terminate a currently set mode. In this case, it is determined whether or not it is a command to terminate the print mode (step S313). If it is a terminate command, then control enters the default communication mode. If it is not a terminate command, it is determined whether or not it is a command valid in the print mode as described above (step S314).

When it is a valid command, the command is executed (step S315), and control is then returned to step S312 to await the reception of a command. If the command is not valid, error processing is performed to issue an error notification to the external device which is a communicatee (step S316), and control is then returned to step S312.

When the command received in the default communication mode is a direct transfer mode start command (step S305), control is passed to a direct transfer mode (step S306). Then, the next command is awaited in the direct transfer mode (step S312). An acceptable command at this time is a command executable in the default communication mode, and a command executable only in the direct transfer mode.

When a command is received, it is determined whether or not the command is a command to terminate a currently set mode. In this case, it is determined whether or not it is a command to terminate the direct transfer mode (step S313). If it is a terminate command, then control enters the default communication mode. If it is not a terminate command, it is determined whether or not it is a command valid in the direct transfer mode (step S314).

When it is a valid command, the command is executed (step S315), and control is then returned to step S312 to await the reception of a command. If the command is not valid, error processing is performed to issue an error notification to the external device which is a communicatee (step S316), and control is then returned to step S312.

When the command received in the default communication mode is a remote control mode start command (step S307), control is passed to a remote control mode (step S308). Then, the next command is awaited in the remote control mode (step S312). An acceptable command at this time is a command executable in the default communication mode, and a command executable only in the remote control mode.

When a command is received, it is determined whether or not the command is a command to terminate the currently set mode. In this case, it is determined whether or not it is a command to terminate the remote control mode (step S313). If it is a terminate command, then control enters the default communication mode. If it is not a terminate command, it is determined, as described above, whether or not it is a command valid in the remote control mode (step S314).

When it is a valid command, the command is executed (step S315), and control is then returned to step S312 to await the reception of a command. If the command is not valid, error processing is performed to issue an error notification to the external device which is a communicatee (step S316), and control is then returned to step S312.

If the command received in S302 is not the print mode start command, the direct transfer mode start command, or the remote control mode start command, then a determination is made in the default communication mode as to whether or not it is another valid command (step S309). If it is a valid command, the command is processed (step S310). If it is not a valid command, error processing is performed, and control is then returned to step S302 (step S311).

Figure 4:
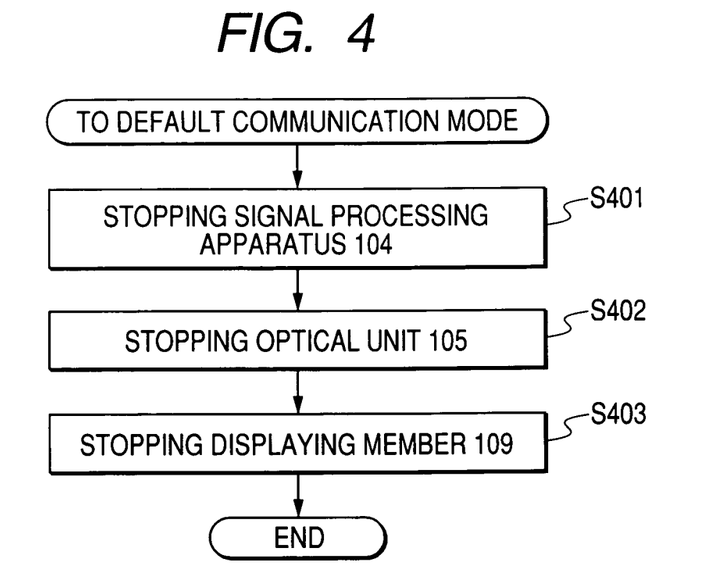
FIG. 4 is a flowchart of the process performed when shifting to a default communication mode.

Described below is the process performed to enter each communication mode. FIG. 4 is a flowchart of the process performed to enter the default communication mode.

In this mode, data in a camera is managed by the operation from the PC. Therefore, a block relating to a shooting function and a block relating to a reproduction function are not required to be operated in the digital camera.

Therefore, first, the operations of the signal processing apparatus 104 to be used in a reproduction or shooting operation are stopped (step S401). Then, the operation of the optical unit 105 to be used during the shooting are also stopped (step S402). Finally, the display member 109 such as an LCD for use in image reproduction and menu display is stopped.

Figure 5:
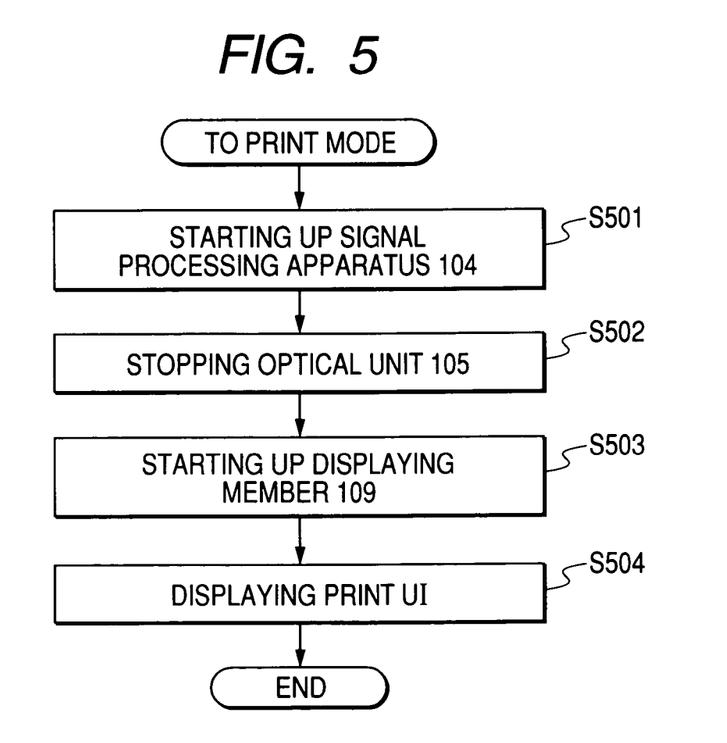
FIG. 5 is a flowchart of the process performed when shifting to a print mode.

FIG. 5 is a flowchart of the process performed to enter the print mode.

In this mode, image data is transmitted to a connected printer to perform a printing operation. Therefore, the operations are the same as those in the normal reproduction mode. Since an instruction to select or print an image is issued by the operation of the camera, it is necessary to operate all blocks other than the function blocks relating to the shooting function.

Therefore, the operation of the signal processing apparatus 104 to be used in a reproduction operation is first started (step S501). Then, the operation of the optical unit 105 to be used in shooting is stopped (step S502). Next, the display member 109 such as an LCD for use in reproducing an image or displaying a menu is activated (step S503). Finally, a process module for printing is activated (step S504).

Figure 6:
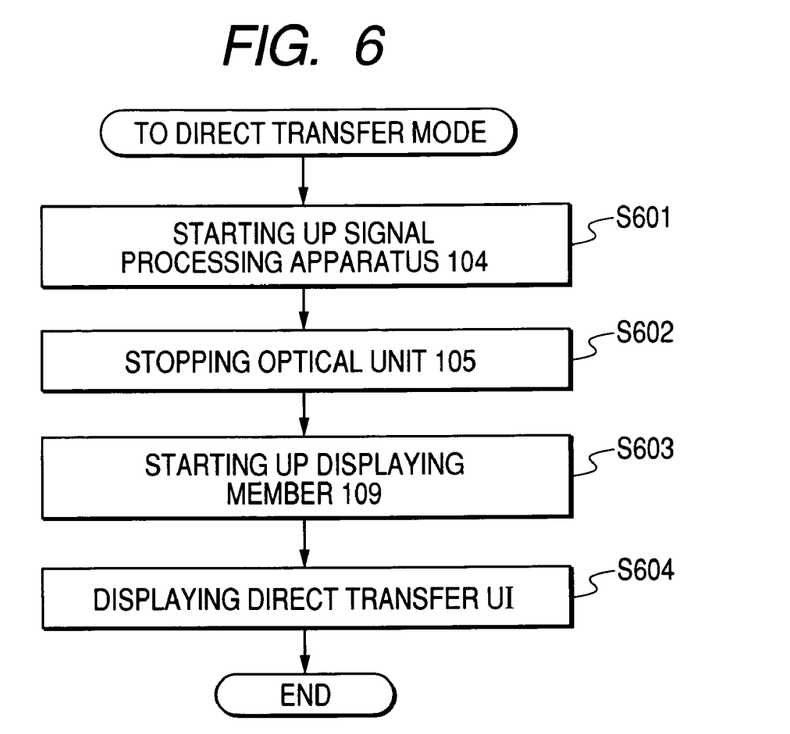
FIG. 6 is a flowchart of the process performed when shifting to a direct transfer mode.

FIG. 6 is a flowchart of the process performed when control is passed to the direct transfer mode. In this mode, image data is transmitted to the connected PC to perform display, storage, etc. Therefore, the operations to be performed are similar to those in the normal regeneration mode. Since an instruction to select or transmit an image is issued by the operation of a camera, it is necessary to operate all blocks other than the blocks relating to the shooting function.

Therefore, the operation of the signal processing apparatus 104 to be used in a reproduction operation is first started (step S601). Then, the operation of the optical unit 105 to be used in shooting is stopped (step S602). Next, the display member 109 such as an LCD for use in reproducing an image or displaying a menu is activated (step S603). Finally, a process module for direct transfer is activated (step S604).

Figure 7:
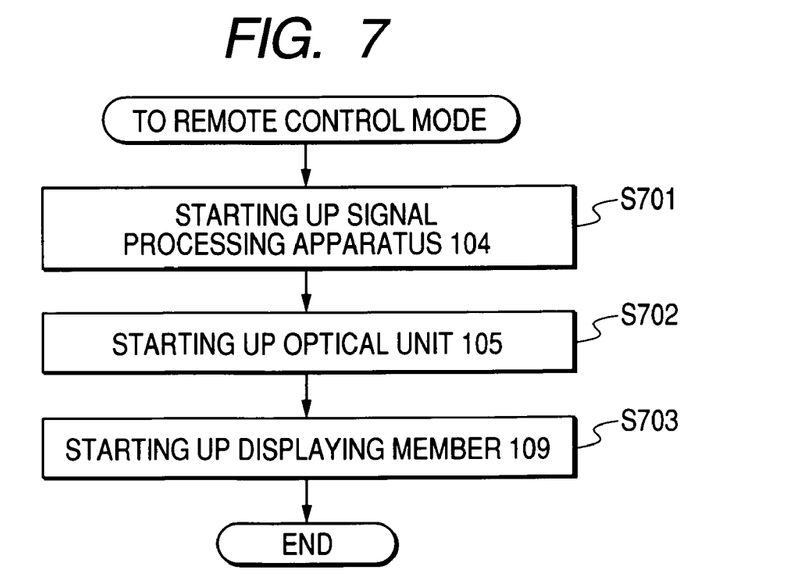
FIG. 7 is a flowchart of the process performed when shifting to a remote control mode.

FIG. 7 is a flowchart of the process performed to enter the remote control mode. In this mode, the shooting function of a camera is controlled by the operation of the PC, and a captured image can be transferred. Therefore, it is necessary to operate the function blocks relating to the shooting function.

The operation of the signal processing apparatus 104 to be used in a shooting operation is first started (step S701). Then, the operation of the optical unit 105 to be used in shooting is started (step S702). Finally, the display member 109 such as an LCD for use in displaying a captured image or displaying a menu is started.

Thus, according to the present embodiment, when a connection to an external device is made, the operations of a signal processing apparatus, an optical unit, and a display member are stopped regardless of the types of a connected device or an application, the default mode, in which only a communication operation can be performed, is entered, and then an operation mode depending on the command received from a connection partner is entered. Therefore, the resources in the camera required for each communication mode can be selectively used, thereby controlling the amount of power consumption with precision.

Furthermore, each communication mode can be flexibly entered in accordance with the conditions of the application of a connection partner, and a user can omit the trouble of the processes required in switching modes.

When each communication mode terminates, control is returned to the default communication mode that requires the lowest power consumption. Therefore, an advantage in power consumption can be realized when an image is transferred by the operation from the PC which may be most frequently used in a normal state or a standby state.

Described below is the second embodiment of the present invention.

In the second embodiment, the basic configuration, the existing statuses and the like are similar to those according to the first embodiment. However, a transfer system in each communication mode is different. Therefore, the operations in an external connection mode of a digital camera according to the second embodiment are explained by referring to the flowchart shown in FIG. 8.

Figure 8:
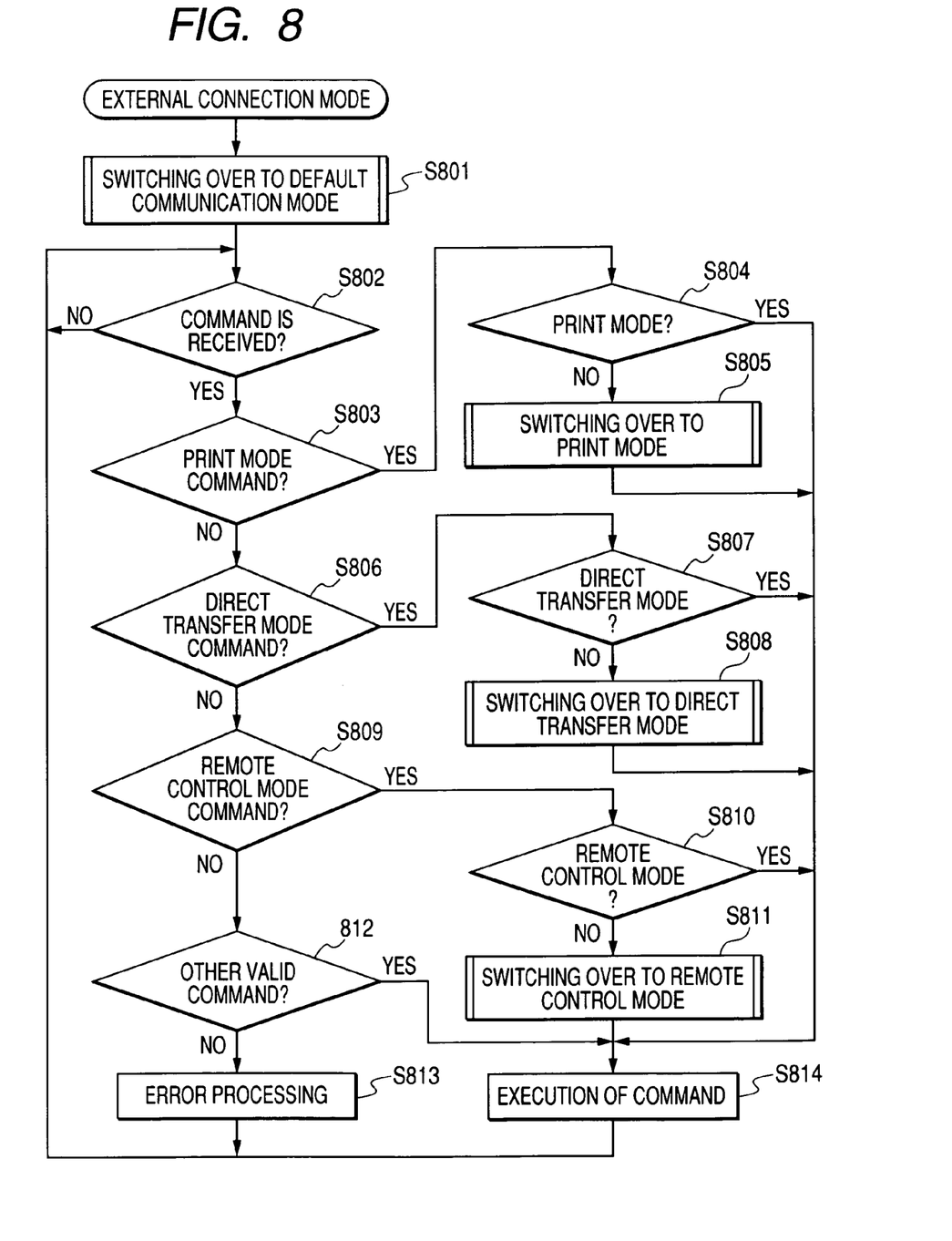
FIG. 8 is a flowchart of the operation in an external connection mode according to another embodiment of the present invention.

When a USB connection is established, and the external connection mode is entered, the default communication mode is first entered (step S801). Then, a command from an external device is acceptable and awaited. When a command is received (step S802), a check is made as to whether or not the received command is a print mode command (step S803).

If it is a print mode command, then it is determined whether or not the current status is a print mode (step S804). If it is not a print mode, then the print mode is entered (step S805), and the command is executed (step S814). If the print mode has already been entered, then the command is executed as is (step S814). Then, control is passed to step S802.

When the received command is a direct transfer mode command, then it is determined whether or not the current status is a direct transfer mode (step S807). If it is not a direct transfer mode, the direct transfer mode is entered (step S808), and the command is executed (step S814). If the print mode has already been entered, then the command is executed as is (step S814). Then, control is returned to step S802.

If the received command is a remote control mode command, then it is determined whether or not the current status is a remote control mode (step S810). If it is not a remote control mode, the remote control mode is entered (step S811), and the command is executed (step S814). If the remote control mode has already been entered, the command is executed as is (step S814). Then, control is returned to step 802.

If the received command is another valid command for the default transfer mode, then the command is executed (step S814). Otherwise, an error notification is issued as error processing to the external device which is a communicatee (step S813). Then, control is returned to step S802.

As described above, according to the present invention embodiment, no command is prepared to enter or terminate each communication mode, but when a command valid only in one mode is received, the camera automatically enters that mode. Therefore, the connection partner is free of the need for consideration of mode switching when a desired application is to be performed.

When a user selects an image and transfers it to a PC while reproducing and displaying an image with a camera set in a reproduction mode, the operations of the module relating to the shooting function of the camera are stopped. On the other hand, when the shooting operation of the camera is remotely controlled by the PC, a module necessary for reproduction is stopped, thereby reducing the power consumption.

It is obvious that the objectives of the present invention can also be attained by providing a storage medium recording a program code of software for realizing the function of the above-mentioned embodiments for a system or an apparatus, with the computer (or the CPU or the MPU) of the system or the apparatus reading and executing the program code stored in the storage medium.

In this case, the program code read from the storage medium realizes the function of the above-mentioned embodiment, and the program code itself and the storage medium storing the program code are aspects of the present invention.

A storage medium for providing a program code can be, for example, a floppy disk, a hard disk, an optical disk, a magneto-optical disk, CD-ROM, CD-R, a magnetic tape, a non-volatile memory card, ROM, etc.

Furthermore, by executing the program code read by the computer, not only the function of the embodiments can be realized, but also all or a part of the actual processes are performed by an OS (basic system or the operating system), etc., operating in the computer at an instruction of the program code, and the function according to the above-mentioned embodiments can be realized by the process.

Furthermore, after a program code read from the storage medium is written to the memory of the feature expansion unit connected to a feature expansion board inserted into the computer and a feature expansion unit connected to the computer, the CPU, etc., of the feature expansion board and the feature expansion unit can perform all or a part of the actual processed at an instruction of the program code, and the function according to the above-mentioned embodiments can be realized by the process.

Many different embodiments of the present invention may be constructed without departing from the spirit and scope of the present invention. It should be understood that the present invention is not limited to the specific embodiments described in the specification, except as defined in the appended claims.

This application claims priority from Japanese Patent Application No. 2004-031112, filed Feb. 6, 2004, which is hereby incorporated by reference herein.

What is claimed is:

1. An imaging apparatus comprising:
   imaging means;
   record and reproduction means for recording and reproducing image data obtained by said imaging means on and from a record medium;
   display means;
   communication means arranged to transmit image data obtained by said imaging means and image data reproduced from the record medium to an external device, said communication means being connectable to the external device through a transmission line;
   control means for controlling operations of said imaging means, said record and reproduction means, said display means and said communication means; and
   mode switch means for switching an operation mode of said imaging means, said record and reproduction means, said display means and said communication means between a plurality of operation modes in accordance with a connection status of said communication means, wherein the plurality of operation modes includes:
   a first mode, in which said control means enables said communication means and stops operations of said imaging means, said record and reproduction means and said display means;
   a second mode, in which said control means enables said communication means, said record and reproduction means to reproduce the image data and said display means to display an image of image data reproduced from the record medium and stops an operation of said imaging means; and
   a third mode, in which said control means enables said imaging means, and said communication means and stops operation of said record and reproducing means,
   wherein said mode switch means sets the first mode when said communication means is changed from a non-connected state to a connected state to the external device, and then switches over to the second mode or the third mode in accordance with the external device connected with said communication means.

2. An apparatus according to claim 1, wherein after setting the first mode, the mode switch means switches over to the second or third mode in accordance with an application function of the external device.

3. An apparatus according to claim 1, wherein after setting the first mode, said mode switch means switches over to the second or third mode when said communication means receives a start command of the second or third mode.

4. An apparatus according to claim 3, wherein said mode switch means switches over to the first mode from the second or third mode when said communication means receives an end command of the second or third mode.

5. An apparatus according to claim 1, wherein after setting the first mode, the mode switch means switches over to the second or third mode when said communication means receives a command valid for the second or third mode.

6. An apparatus according to claim 1, wherein in the second mode, said communication means transmits image data reproduced from the record medium by the record and reproduction means to the external device.

7. An apparatus according to claim 6, further comprising selection means for selecting image data to be transmitted to the external device from the image data recorded on the record medium.

8. An apparatus according to claim 1, wherein in the third mode, said communication means transmits image data obtained by the imaging means to the external device.

9. A method for controlling an imaging apparatus including an imaging means, record and reproduction means for recording and reproducing image data captured by the imaging means on and from a record medium, display means, communication means arranged to transmit image data obtained by the imaging means and image data reproduced from the record medium to plural external devices, said control method comprising:
   a control step of controlling the imaging means, the record and reproduction means, the display means and the communication means so as to switch an operation mode of the imaging means, the record and reproduction means, the display means and the communication means between a plurality of operation modes in accordance with a connection status of the communication means, wherein the plurality of operation modes includes:
   a first mode, in which said control step includes enabling the communication means and stopping operations of the imaging means, the record and reproducing means and the display means,
   a second mode, in which said control step includes enabling the communication means, the record and reproducing means to reproduce the image data and the display means to display an image of image data reproduced from the record medium and stopping an operation of the imaging means, and a third mode, in which said control step includes enabling the imaging means, and the communication means and stopping operation of the record and reproducing means, wherein said control step includes setting the first mode when the communication means is changed from a non-connected state to a connected state to the external device, and then switching over to the second mode or the third mode in accordance with the external device connected with the communication means.

10. An imaging apparatus comprising:

imaging means;

record and reproduction means for recording and reproducing image data obtained by said imaging means on and from a record medium;

display means;

communication means arranged to transmit the image data obtained by said imaging means and the image data reproduced from the record medium to an external device, said communication means being connectable to the external device through a transmission line;

control means for controlling operations of said imaging means, said record and reproducing means, said display means and said communication means; and mode switch means for switching an operation mode of said imaging means, said record and reproducing means, said display means and said communication means between a plurality of operation modes in accordance with a connection status of said communication means, wherein the plurality of operation modes includes:

a first mode, in which said control means enables said communication means and stops operations of said imaging means, said record and reproducing means and said display means, wherein said mode switching means sets the first mode when said communication means is changed from a non-connected state to a connected state to the external device;

a second mode, in which said control means enables said communication means, said record and reproducing means to reproduce the image data and said display means to display an image of the image data reproduced from the record medium and stops operation of said imaging means; and a third mode, in which said control means enables said imaging means, and said communication means and stops operation of said record and reproducing means.

11. An apparatus according to claim 10, wherein said mode switch means switches over to the second mode or the third mode in accordance with a kind of the external device connected with said communication means.

12. An apparatus according to claim 11, wherein after setting the first mode, the mode switch means switches over to the second or third mode when said communication means receives a start command of the second or third mode.

13. An apparatus according to claim 12, wherein the mode switch means switches over to the first mode from the second or third mode when said communication means receives an end command to end the second or third mode, respectively.

14. An apparatus according to claim 11, wherein after setting the first mode, the mode switch means switches over to the second or third mode when said communication means receives a command valid for the second or third mode, respectively.

15. An apparatus according to claim 10, wherein in the second mode, said communication means transmits image data reproduced from the record medium by the record and reproduction means to the external device.

16. An apparatus according to claim 10, wherein in the third mode, said communication means transmits image data obtained by the imaging means to the external device.

17. A method for controlling an imaging apparatus comprising imaging means, record and reproduction means for recording and reproducing image data obtained by the imaging means on and from a record medium, display means, communication means arranged to transmit the image data obtained by the imaging means and the image data reproduced from the record medium to an external device, the communication means being connectable to the external device through a transmission line, said control method comprising:

a control step, of controlling operations of the imaging means, the record and reproducing means, the display means and the communication means so as to switch an operation mode of the imaging means, the record and reproducing means, the display means and the communication means between a plurality of operation modes in accordance with a connection status of the communication means, wherein the plurality of operation modes includes:

a first mode, in which said control step includes enabling the communication means and stopping operations of the imaging means, the record and reproducing means and the display means, wherein the first mode is set in said control step when said communication means is changed from a non-connected state to a connected state to the external device;

a second mode, in which said control step includes enabling the communication means, the record and reproducing means to reproduce the image data and the display means to display an image of the image data reproduced from the record medium and stopping operation of the imaging means; and a third mode, in which said control step includes enabling the imaging means, and the communication means and stopping operation of the record and reproducing means.

* * * * *